US011275724B2

(12) United States Patent
Bell et al.

(10) Patent No.: US 11,275,724 B2
(45) Date of Patent: Mar. 15, 2022

(54) AUTOMATED FEEDBACK VALIDATION

(71) Applicant: INTERNATIONAL BUSINESS MACHINES CORPORATION, Armonk, NY (US)

(72) Inventors: Denise Bell, Austin, TX (US); Stefania Errore, Rome (IT); Valory Batchellor, Wallingford (GB)

(73) Assignee: International Business Machines Corporation, Armonk, NY (US)

( * ) Notice: Subject to any disclaimer, the term of this patent is extended or adjusted under 35 U.S.C. 154(b) by 109 days.

(21) Appl. No.: 16/832,557

(22) Filed: Mar. 27, 2020

(65) Prior Publication Data

US 2021/0303546 A1  Sep. 30, 2021

(51) Int. Cl.
*G06F 16/23* (2019.01)
*G06F 16/9537* (2019.01)
*G06F 16/9535* (2019.01)

(52) U.S. Cl.
CPC ...... *G06F 16/2365* (2019.01); *G06F 16/9535* (2019.01); *G06F 16/9537* (2019.01)

(58) Field of Classification Search
None
See application file for complete search history.

(56) References Cited

U.S. PATENT DOCUMENTS

| 7,337,127 | B1 | 2/2008 | Smith | |
|---|---|---|---|---|
| 7,680,501 | B2 * | 3/2010 | Sillasto | H04W 64/00 455/456.1 |
| 8,086,622 | B2 * | 12/2011 | Bennett | G06F 16/951 707/766 |
| 8,788,502 | B1 * | 7/2014 | Hensel | G06F 16/951 707/738 |
| 9,176,957 | B2 | 11/2015 | Myslinski | |
| 9,536,148 | B2 | 1/2017 | Gross | |
| 10,250,381 | B1 | 4/2019 | Rice | |
| 2002/0049624 | A1 | 4/2002 | Raveis | |
| 2007/0233565 | A1 | 10/2007 | Herzog | |

(Continued)

FOREIGN PATENT DOCUMENTS

WO  2019043379 A1  3/2019

OTHER PUBLICATIONS

Well, Peter et al.; "The NIST Definition of Cloud Computing;" National Institute of Standards and Technology; Special Publication 800-145; Sep. 2011; 7 pages.

*Primary Examiner* — Kim T Nguyen
(74) *Attorney, Agent, or Firm* — Schmeiser, Olsen & Watts; Stephanie Carusillo

(57) ABSTRACT

A method, system, and program product for implementing automated feedback validation is provided. The method includes monitoring an Internet search associated with locating preferred user attributes associated with a specified geographical location. Results of the Internet search are analyzed and the preferred user attributes are verified for accuracy. Discrepancies between the preferred user attributes and attributes associated with the specified geographical location are determined and a resulting a confidence factor is applied to the preferred user attributes with respect to a level of accuracy of the preferred user attributes. A notification indicating a confidence rating applied to the preferred user attributes with respect to the level of accuracy is transmitted to the user.

20 Claims, 11 Drawing Sheets

(56) References Cited

U.S. PATENT DOCUMENTS

| | | | |
|---|---|---|---|
| 2011/0106610 A1 | 5/2011 | Landis | |
| 2012/0213404 A1* | 8/2012 | Steiner | G06F 16/5838 |
| | | | 382/103 |
| 2012/0271848 A1* | 10/2012 | Kadowaki | G06F 16/29 |
| | | | 707/769 |
| 2020/0285636 A1* | 9/2020 | Liu | G06F 16/2228 |
| 2020/0309541 A1* | 10/2020 | Lavy | G01S 19/485 |
| 2020/0401621 A1* | 12/2020 | Bender | G06F 16/71 |
| 2021/0124966 A1* | 4/2021 | Blais-Morin | G08G 1/133 |

\* cited by examiner

AUTOMATED FEEDBACK VALIDATION

BACKGROUND

The present invention relates generally to a method for validating automated feedback and in particular to a method and associated system for improving software and Internet technology associated with monitoring and analyzing Internet searches for detecting user attributes and determining a confidence level of the user attributes with respect to a level of an associated accuracy.

SUMMARY

A first aspect of the invention provides an automated feedback validation method comprising: monitoring, by a processor of a hardware device, in response to receiving permission from a user, an Internet search associated with locating preferred user attributes associated with a specified geographical location; analyzing, by said processor, results of said Internet search; verifying, by said processor, based on results of said analyzing, said preferred user attributes for accuracy; determining, by said processor, based on results of said verifying, discrepancies between said preferred user attributes and attributes associated with said specified geographical location; applying, by said processor, based on results of said determining, a confidence factor to said preferred user attributes with respect to a level of said accuracy; and transmitting, by said processor, a notification indicating a confidence rating applied to said preferred user attributes with respect to the level of said accuracy.

A second aspect of the invention provides a computer program product comprising a computer readable hardware storage device storing a computer readable program code, said computer readable program code comprising an algorithm that when executed by a processor of a hardware device implements an automated feedback validation method, said method comprising: monitoring, by said processor, in response to receiving permission from a user, an Internet search associated with locating preferred user attributes associated with a specified geographical location; analyzing, by said processor, results of said Internet search; verifying, by said processor, based on results of said analyzing, said preferred user attributes for accuracy; determining, by said processor, based on results of said verifying, discrepancies between said preferred user attributes and attributes associated with said specified geographical location; applying, by said processor, based on results of said determining, a confidence factor to said preferred user attributes with respect to a level of said accuracy; and transmitting, by said processor, a notification indicating a confidence rating applied to said preferred user attributes with respect to the level of said accuracy.

A third aspect of the invention provides a hardware device comprising a processor coupled to a computer-readable memory unit, said memory unit comprising instructions that when executed by the processor implements an automated feedback validation method comprising: monitoring, by said processor, in response to receiving permission from a user, an Internet search associated with locating preferred user attributes associated with a specified geographical location; analyzing, by said processor, results of said Internet search; verifying, by said processor, based on results of said analyzing, said preferred user attributes for accuracy; determining, by said processor, based on results of said verifying, discrepancies between said preferred user attributes and attributes associated with said specified geographical location; applying, by said processor, based on results of said determining, a confidence factor to said preferred user attributes with respect to a level of said accuracy; and transmitting, by said processor, a notification indicating a confidence rating applied to said preferred user attributes with respect to the level of said accuracy.

The present invention advantageously provides a simple method and associated system capable of accurately validating automated feedback.

DETAILED DESCRIPTION

Figure 1:
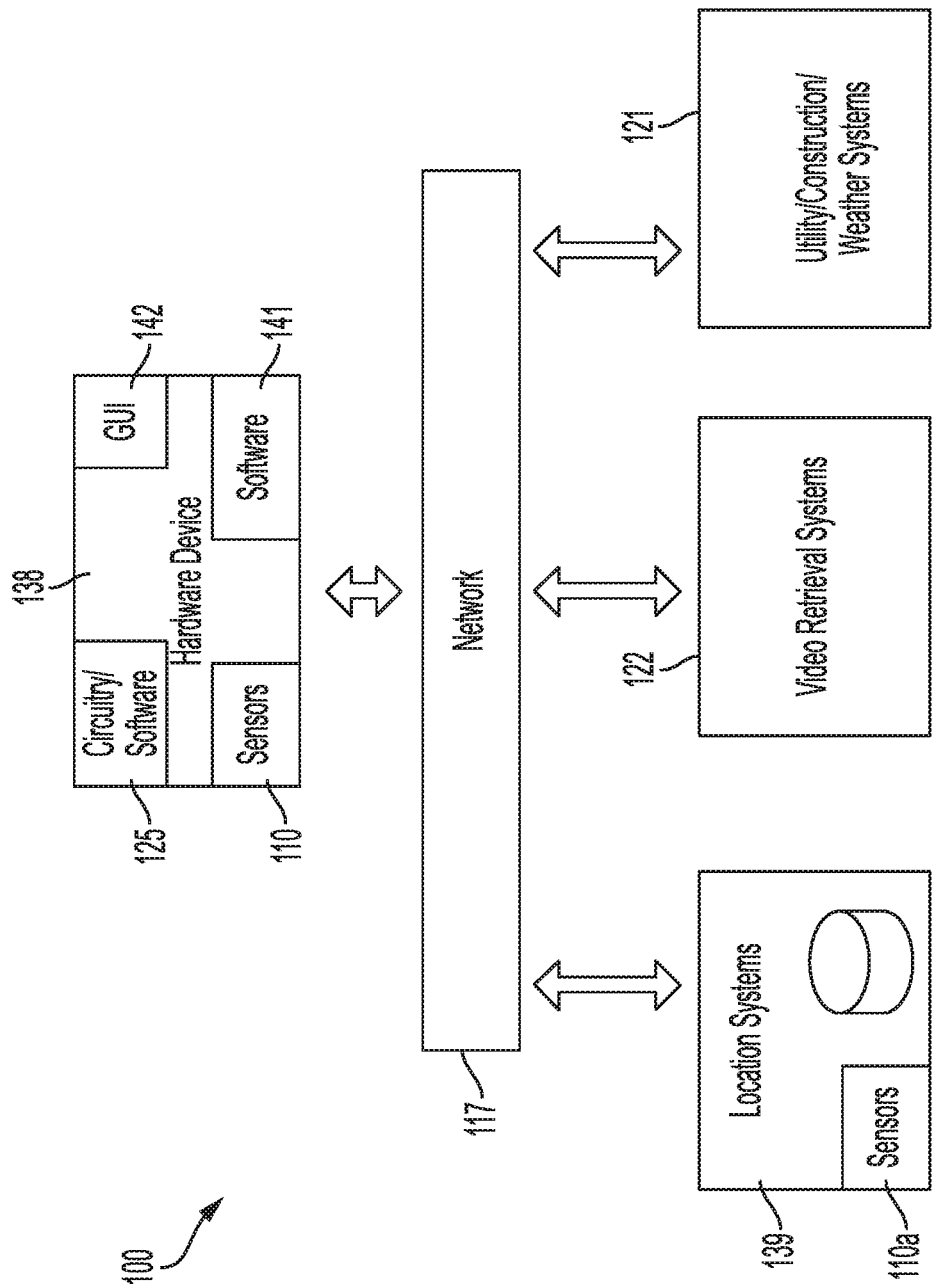
FIG. 1 illustrates a block diagram of a system for improving software and Internet technology associated with monitoring and analyzing Internet searches for detecting user attributes and determining a confidence level of the user attributes with respect to a level of an associated accuracy, in accordance with embodiments of the present invention.

FIG. 1 illustrates a block diagram of a system 100 for improving software and Internet technology associated with monitoring and analyzing Internet searches for detecting user attributes and determining a confidence level of the user attributes with respect to a level of an associated accuracy, in accordance with embodiments of the present invention. Websites associated with travel locations typically promote the locations as being associated with positive attributes. For example, a hotel may promote itself as being associated with specified qualifications such as, inter alia, a sandy beach, accessible services, close proximity to specified facilities, having safety or specified security characteristics, etc., but when a customer arrives at the hotel, the facility may not be associated with the promoted specified qualifications (e.g., the beach may be rocky instead of sandy). The aforementioned incorrect specified qualifications may significantly impact the customer's experience. Additionally, when a customer pursues a property (via the Internet), the customer typically relies on the published images being presented to enhance the property. Relying on the published images may not allow the customer to view real impartial images of the property in question. Therefore, system 100 enables a process for evaluating a location or property with respect to customer requirements or specifications, detecting any discrepancies or inconsistencies (between customer requirements and actual attributes), and applying a confidence rating (to the presented information) for presentation to the customer.

System 100 of FIG. 1 includes a hardware device 138 (i.e., specialized hardware device), location systems 139, a video retrieval systems 122, and utility/construction/weather systems 121 interconnected through a network 117. Hardware device 138 may include, inter alia, a mobile phone, a PDA, a tablet, a computing device, a dedicated device, etc. Hardware device 138 may be Bluetooth® enabled to provide connectivity to any type of system. Hardware device 138 includes specialized circuitry/software 125 (that may include specialized software), sensors 110, software 141, and a GUI 142. Sensors 110 may include any type of internal or external sensor (or biometric sensor) including, inter alia, ultrasonic three-dimensional sensor modules, an optical sensor, a video retrieval device, an audio retrieval device, humidity sensors, voltage sensors, a keyboard, a mouse, a touch screen, a temperature sensor, etc. Location systems 139 includes a database and sensors 110a. Location systems 139 comprises a system for promoting and communicating with an entity providing a service (e.g., a hotel). Sensors 110a may include any type of internal or external sensor (or biometric sensor) including, inter alia, ultrasonic three-dimensional sensor modules, an optical sensor, a video retrieval device, an audio retrieval device, humidity sensors, voltage sensors, a keyboard, a mouse, a touch screen, a temperature sensor, etc. Video retrieval systems 122 comprises video retrieval devices (e.g., Webcams) for retrieving video data from locations within and surrounding a location associated with location systems 139. Utility/construction/weather systems 121 comprises hardware systems for retrieving data associated with the location associated with location systems 139. For example, utility/construction/weather systems 121 may include, utility cameras (e.g., traffic cams), construction site sensors (cameras, light sensors, motion sensors, etc.) for detecting attributes of a construction site adjacent to the location associated with location systems 139, weather detection systems, etc. Hardware device 138, location systems 139, video retrieval systems 122, and utility/construction/weather systems 121 may each comprise an embedded device. An embedded device is defined herein as a dedicated device or computer comprising a combination of computer hardware and software (fixed in capability or programmable) specifically designed for executing a specialized function. Programmable embedded computers or devices may comprise specialized programming interfaces. In one embodiment, hardware device 138, location systems 139, a video retrieval systems 122, and utility/construction/weather systems 121 may each comprise a specialized hardware device comprising specialized (non-generic) hardware and circuitry (i.e., specialized discrete non-generic analog, digital, and logic-based circuitry) for (independently or in combination) executing a process described with respect to FIGS. 1-7. The specialized discrete non-generic analog, digital, and logic-based circuitry may include proprietary specially designed components (e.g., a specialized integrated circuit, such as for example an Application Specific Integrated Circuit (ASIC) designed for only implementing an automated process for improving software and Internet technology associated with monitoring and analyzing Internet searches for detecting user attributes and determining a confidence level of the user attributes with respect to a level of an associated accuracy. Network 117 may include any type of network including, inter alia, a 5G telecom network, a local area network, (LAN), a wide area network (WAN), the Internet, a wireless network, etc. Alternatively, network 117 may include an application programming interface (API).

The following process describes an implementation example with respect to validating an accuracy of an Internet presentation associated with a specified geographical location.

The process is initiated when images (used for Internet presentations) are compared with related images to determine image accuracy with respect to actual conditions at a specified geographical location. The image comparison process may include capturing geo-spatial data and timestamp data associated with the images, retrieving global positioning satellite (GPS) data associated with the images, and executing blockchain code for tracking image features over time. Capturing the geo-spatial data and timestamp data associated with the images may include: retrieving image information from mapping applications, digital sources, and/or owner maps and specifications (e.g., construction project updates, property condition updates, condition change updates, etc.). Retrieving GPS data associated with the images may include extracting location based metadata to ensure that the image accurately represents a presented location and reviewing detected weather information to determine if any destructive storms have affected the geographical location with a given timeframe. Executing blockchain code for tracking image features over time may enable a process to provide security and validation of the images and associated specifications. Subsequently, the images are compared to user input specifications. The comparison may include executing image recognition tools, verifying timestamps within the images being evaluated, and evaluate feedback from user input (e.g., ratings, social media images posted from previous visitors, etc.). Textual descriptions for the images are evaluated and compared with user input to ensure synchronization. For example, when a user communicates with an agent or chat application, system 100 enables analytics to capture requirements and evaluate an importance level for the user based on tone analytics. Resulting data is configured to provide a rating based on the user's requirements. If some features of the images are not associated with the user's specifications, the features may be modified.

Figure 2:
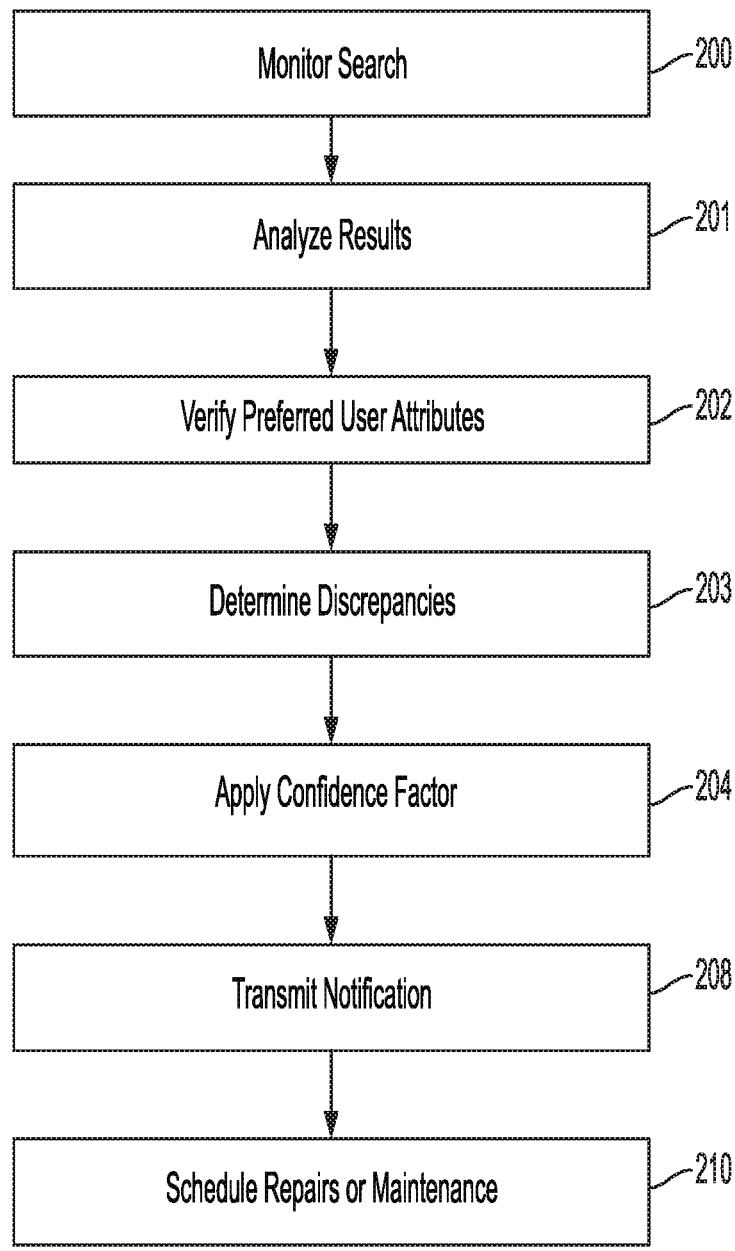
FIG. 2 illustrates an algorithm detailing a process flow enabled by the system of FIG. 1 for improving software and Internet technology associated with monitoring and analyzing Internet searches for detecting user attributes and determining a confidence level of the user attributes with respect to a level of an associated accuracy, in accordance with embodiments of the present invention.

FIG. 2 illustrates an algorithm detailing a process flow enabled by system 100 of FIG. 1 for improving software and Internet technology associated with monitoring and analyzing Internet searches for detecting user attributes and determining a confidence level of the user attributes with respect to a level of an associated accuracy, in accordance with embodiments of the present invention. Each of the steps in the algorithm of FIG. 2 may be enabled and executed in any order by a computer processor(s) executing computer code. Additionally, each of the steps in the algorithm of FIG. 2 may be enabled and executed in combination by hardware device 138, location systems 139, video retrieval systems 122, and utility/construction/weather systems 121. In step 200, an Internet search is monitored in response to receiving permission from a user. The Internet search is associated with locating preferred user attributes associated with a specified geographical location. In step 201, results of the Internet search are analyzed. In step 202, the preferred user attributes are verified for accuracy based on results of the analysis of step 201. The preferred user attributes may include, inter alia, requirements of specified geographical location features of the specified geographical location, selected options of the specified geographical location, etc. The preferred user attributes may be associated with a structure located at the specified geographical location. Verifying the preferred user attributes for accuracy may include retrieving and analyzing feedback from an individual comprising an association with the specified geographical location. The feedback may be retrieved from social media sources of the individual. Additionally, the feedback may include, inter alia, comments of the individual with respect to the geographical location, photographs associated with the geographical location, etc. Verifying the preferred user attributes for accuracy may alternatively include retrieving and analyzing feedback from a plurality of video retrieval devices located at the geographical location and/or retrieving and analyzing feedback from construction update sources associated with the geographical location. Results of the verification may indicate that all attributes of the preferred user attributes have not been located and a confirmation associated with an availability of all attributes of the preferred user attributes may be received from an agent associated with the specified geographical location.

In step 203, discrepancies between the preferred user attributes and attributes associated with the specified geographical location are determined based on results of the verification of step 202. In step 204, a confidence factor is applied to the preferred user attributes with respect to a level of accuracy of the preferred user attributes based on results of step 203. The confidence factor may be generated based on the confirmation of step 202.

In step 208, a notification indicating a confidence rating applied to the preferred user attributes with respect to the level of accuracy. In step 210, repairs and/or maintenance is scheduled based on the confidence factor of step 204. The repairs and/or maintenance is associated with devices of the specified geographical location. The notification of step 208 may indicate the repairs and/or maintenance.

Figure 3:
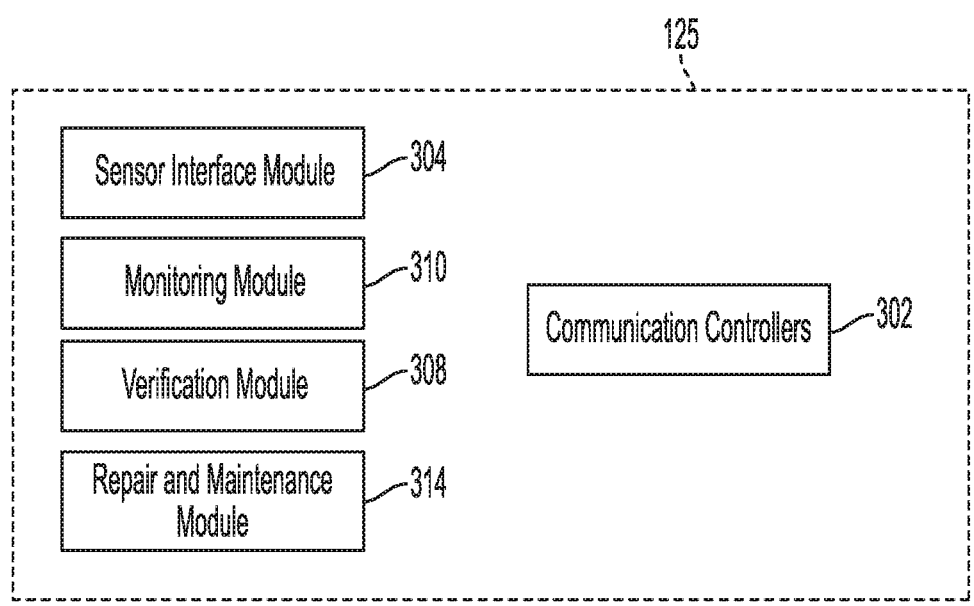
FIG. 3 illustrates a block diagram of an internal structural view of circuitry/software of the system of FIG. 1, in accordance with embodiments of the present invention.

FIG. 3 illustrates a block diagram of an internal structural view of circuitry/software 125 of the system 100 of FIG. 1, in accordance with embodiments of the present invention. Circuitry/software 125 includes a sensor interface module 304, monitoring module 310, a verification module 308, a repair and maintenance module 314, and communication controllers 302. Sensor interface module 304 comprises specialized hardware and software for controlling all functions related to sensors 110 of FIG. 1. Monitoring module 310 comprises specialized hardware and software for controlling all functionality related to monitoring processes for implementing the process described with respect to the algorithm of FIG. 2. Verification module 308 comprises specialized hardware and software for controlling all functions related to the verification steps of FIG. 2. Repair and maintenance module 314 comprises specialized hardware and software for controlling all functions related to enabling repair and maintenance processes in accordance with the algorithm of FIG. 2. Communication controllers 302 are enabled for controlling all communications between sensor interface module 304, monitoring module 310, verification module 308, and repair and maintenance module 314.

Figure 4A:
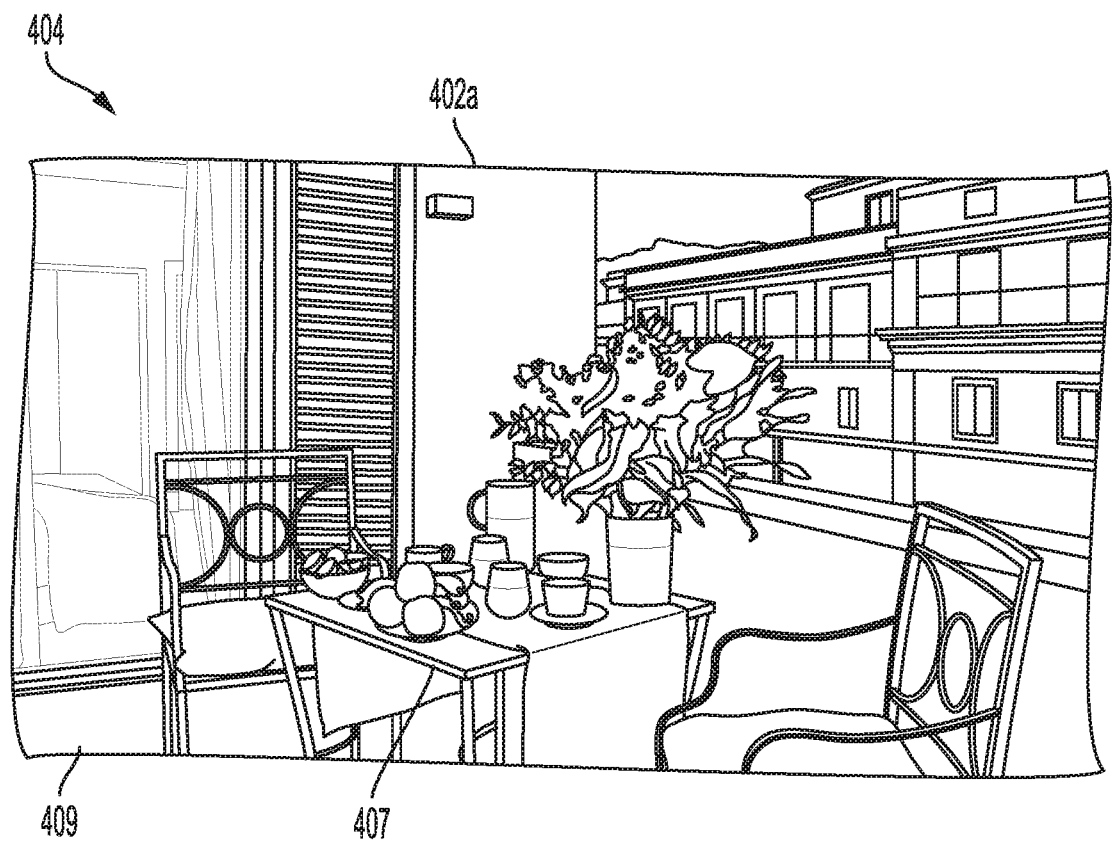
FIGS. 4A-4C illustrate an implementation example associated with Internet images for presenting features of a room at a hotel, in accordance with embodiments of the present invention.
Figure 4B:
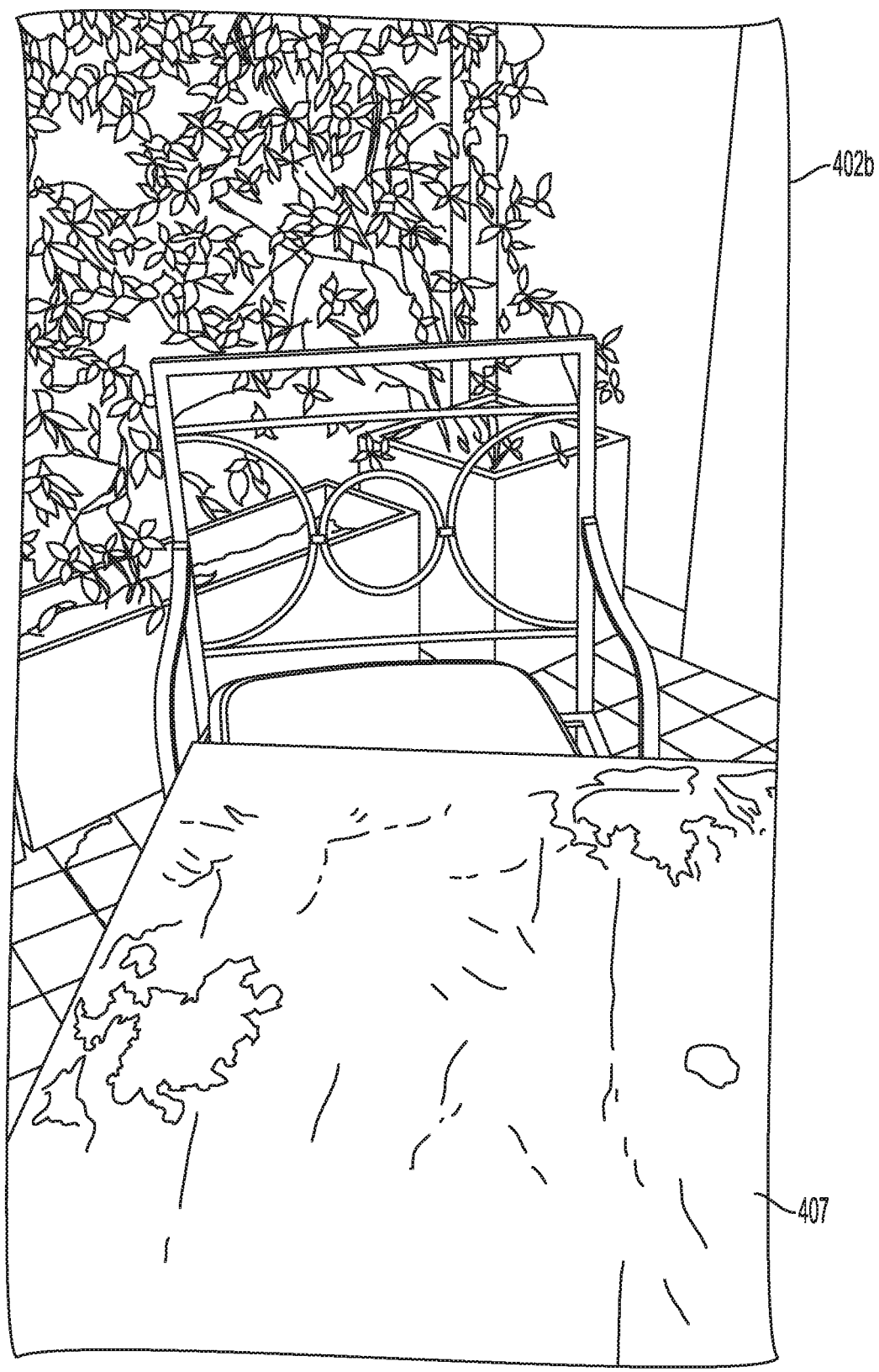
Figure 4C:
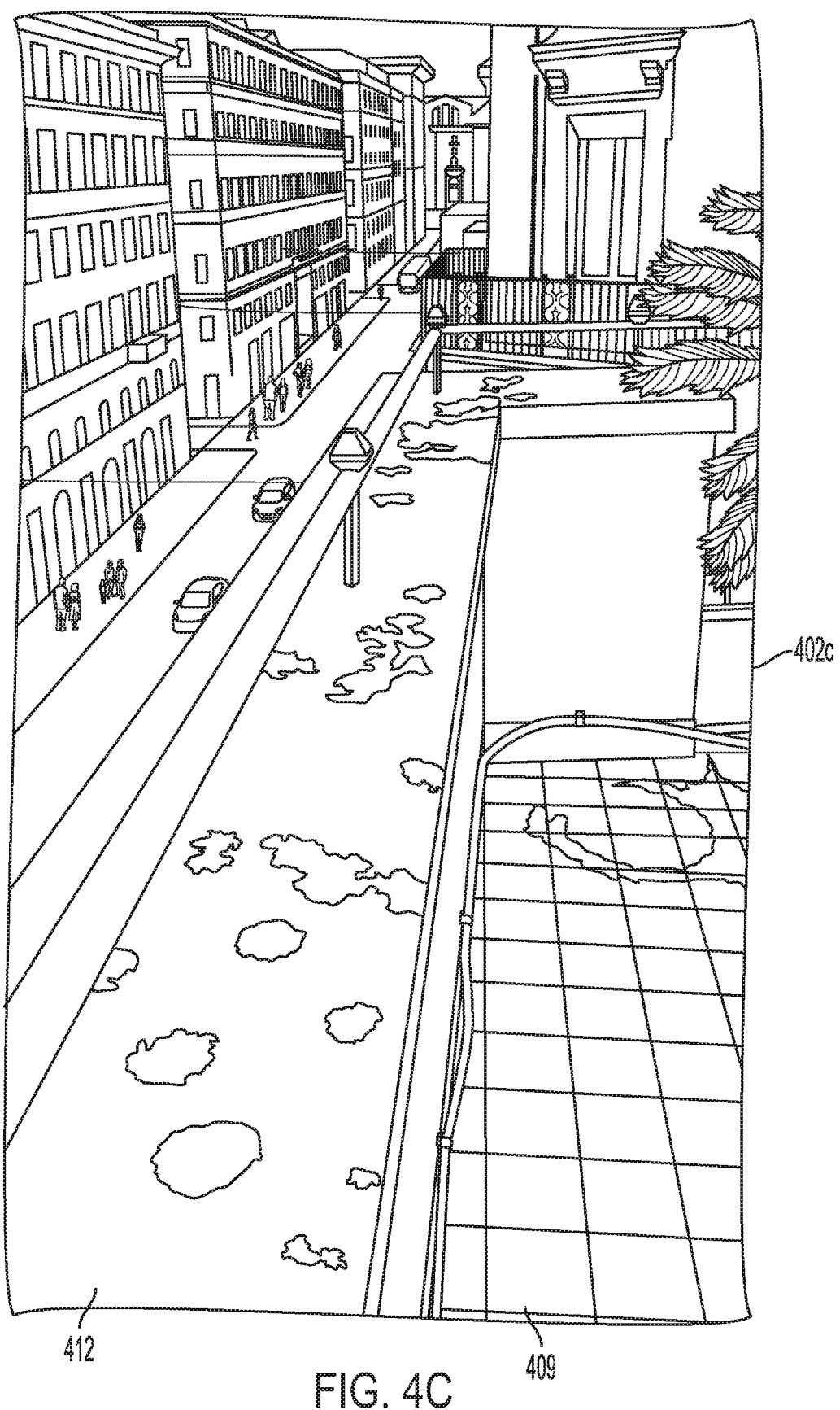

FIGS. 4A-4C illustrate an implementation example associated with Internet images for presenting features 404 of a room at a hotel, in accordance with embodiments of the present invention. FIGS. 4A-4C are associated with images of a hotel selected (by a user) based on an image 402a (in FIG. 4A) viewed via Website (for the hotel) generated images. Image 402a presents an overall view of a terrace of a hotel room. The terrace (in FIG. 4A) includes a distance view of a table 407 and a tile floor 409 of the terrace. In response to viewing the image of FIG. 4A, the user submits a request (e.g., via system 100 of FIG. 1) to determine an accuracy of image 402a. Additionally, the user requests verification that requested requirements and specifications (e.g., condition requirements) are accurate. Therefore, the system executes a process for rating an accuracy of image 402a. In response, the system retrieves an image 402b and an image 402c from an external camera not associated with the hotel. For example, images 402b and 402c may be retrieved from a satellite mapping application, a traffic camera device, a construction site photo, a Web cam for an adjacent structure, etc. Image 402b illustrates a close up view of table 407. The close up view of table 407 shows scratches and flaws of the table 407. Image 402c illustrates a close up view of floor 409 and a wall and railing 412. The close up view of floor 409 and a wall and railing 412 shows scratches and flaws of floor 409 and wall and railing 412. Therefore, the system 100 provides the accuracy rating of the hotel based on comparing the hotel generated image 402a to externally retrieved images 402b and 402c.

Figure 5A:
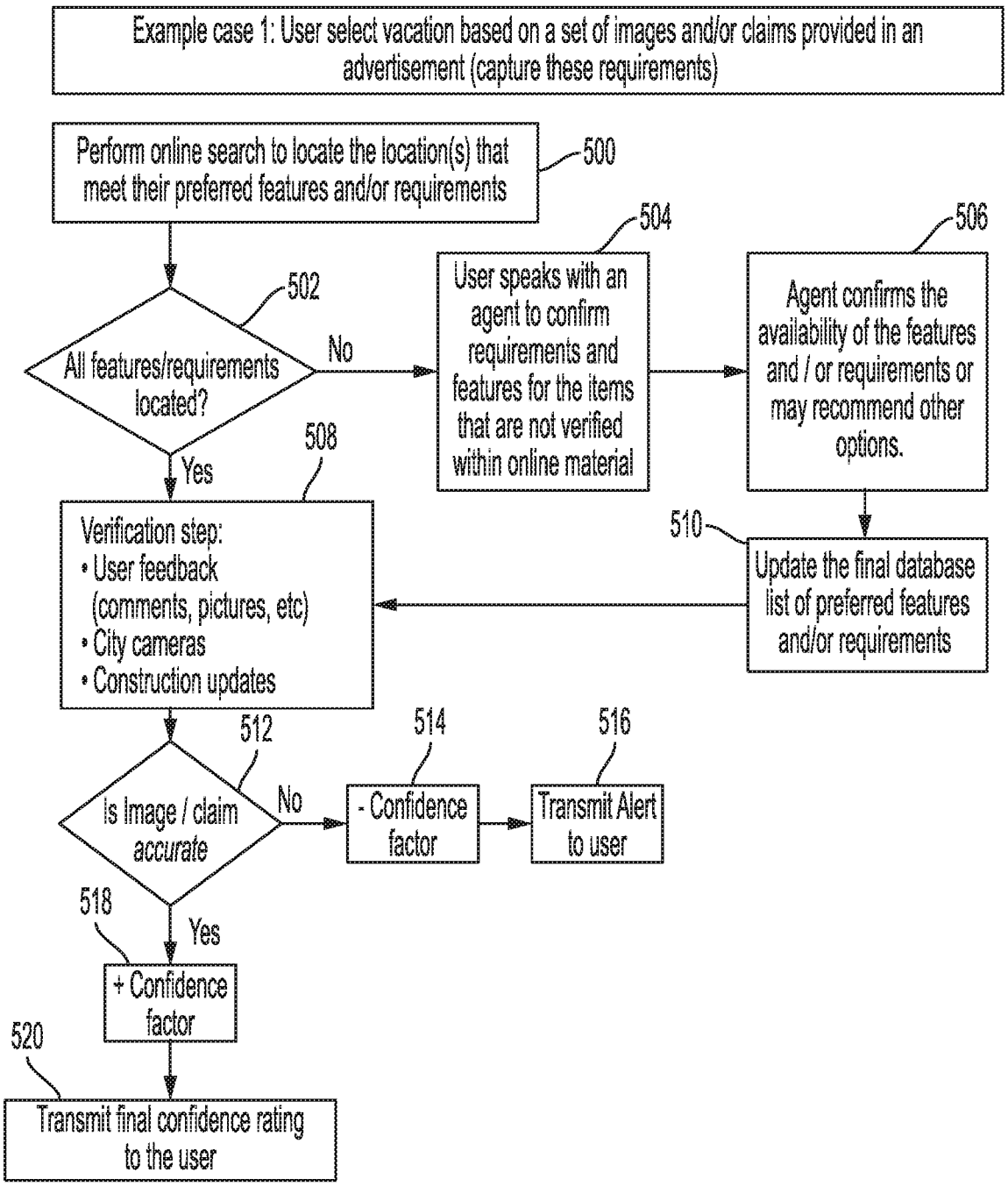
FIG. 5A illustrates an algorithm detailing a process flow detailing a vacation based implementation example associated with verifying a set of images, in accordance with embodiments of the present invention.

FIG. 5A illustrates an algorithm detailing a process flow detailing a vacation based implementation example associated with verifying a set of images, in accordance with embodiments of the present invention. In step 500, a user booking a vacation performs an online search to search for a location(s), such as a hotel, that meets requirements and/or preferred features of the location(s). For example, the user may search for a hotel that has a swimming pool and beach access. In step 502, it is determined if all features and/or requirements are located during the Internet search. If in step 502, it is determined all features and/or requirements are not located during the Internet search, then in step 504, the user speaks with an agent (for the location) to confirm the features and/or requirements that have not been verified during the online search. In step 506, the agent confirms unverified features and/or requirements and recommends additional features and/or requirement options. In step 510, a final database list is updated with the verbally verified features and/or requirement options and/or the additional features and/or requirement options and step 508 is executed as described, infra.

If in step 502, it is determined all features and/or requirements are located during the Internet search, then in step 508, an automated verification step is executed to verify all verbally verified features and/or requirement options and/or the additional features and/or requirement options. The automated verification step may include executing verification code with respect to retrieved user feedback (e.g., social media comments, pictures, etc.), video from city cameras, construction update sources, etc. In step 512, it is determined (based on results of step 508) if the images and/or feature/requirement claims are accurate. If in step 512, it is determined that the images and/or feature/requirement claims are not accurate, then in step 514, a negative confidence factor is applied to the images and/or feature/requirement claims and an associated alert (indicating the accuracy) is transmitted to the user in step 516. In step 512, if it is determined that the images and/or feature/requirement claims are accurate, then in step 518, a positive confidence factor is applied to the images and/or feature/requirement claims and an associated alert (indicating the accuracy) is transmitted to the user in step 520.

Figure 5B:
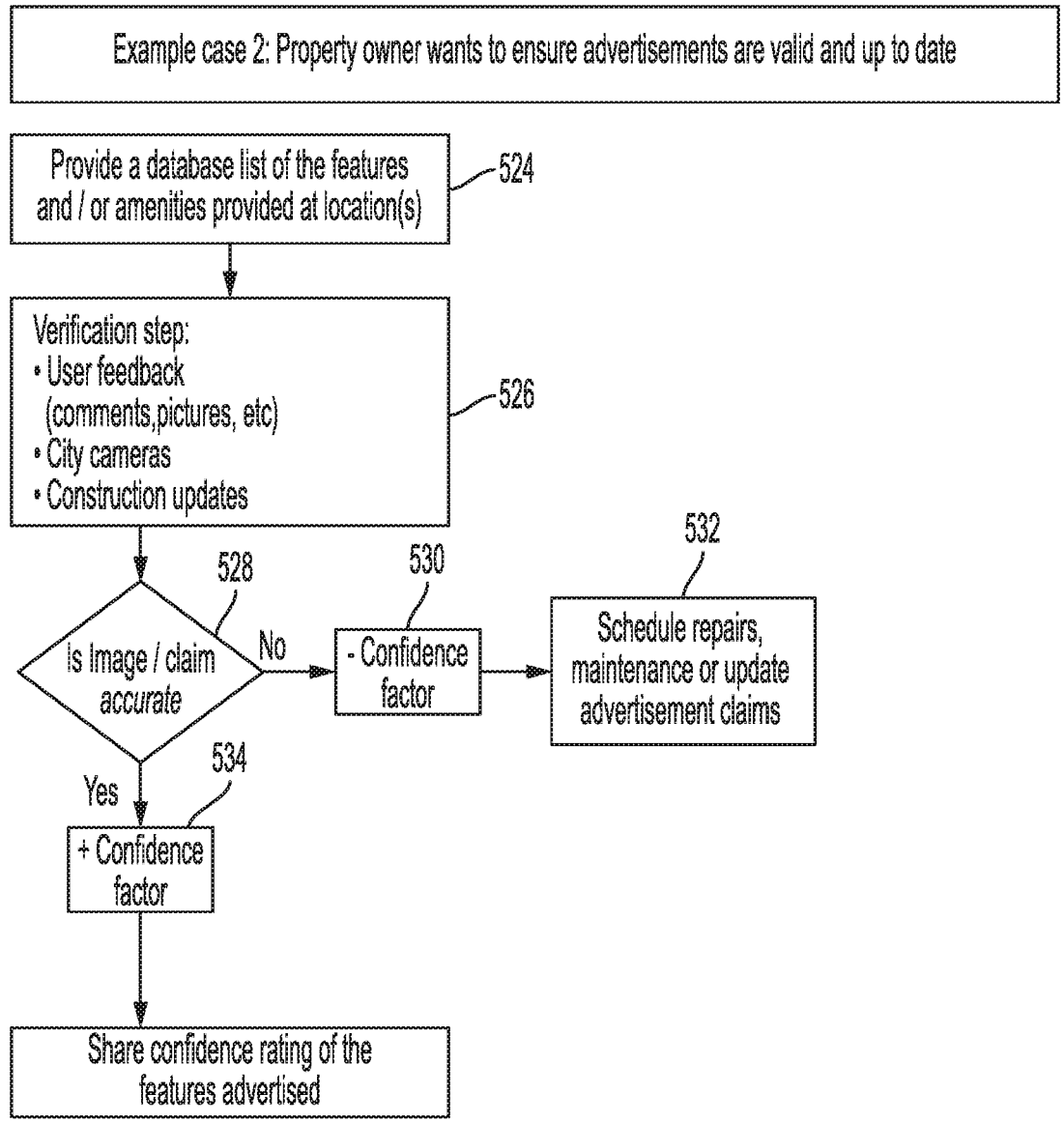
FIG. 5B illustrates an algorithm detailing a process flow detailing a property owner implementation example associated with verifying associated information, in accordance with embodiments of the present invention.

FIG. 5B illustrates an algorithm detailing a process flow detailing a property owner implementation example associated with verifying associated information, in accordance with embodiments of the present invention. In step 524, a database list of features and/or amenities (associated with a property) is provided for a user. In step 526, an automated verification step is executed to verify the list of features and/or amenities. The automated verification step may include executing verification code with respect to retrieved user feedback (e.g., social media comments, pictures, etc.), video from city cameras, construction update sources, etc. In step 528, it is determined (based on results of step 526) if the images and/or list of features and/or amenity claims are accurate. If in step 512, it is determined that the images and/or feature/requirement claims are not accurate, then in step 530, a negative confidence factor is applied to the list of features and/or amenity claims and associated repairs and/or maintenance functions are scheduled for execution in step 532. Alternatively, or additionally advertisement claims may be updated in accordance with results of step 528. If in step 528, it is determined that the images and/or feature/requirement claims are accurate, then in step 534, a positive confidence factor is applied to the images and/or feature/requirement claims the positive confidence rating is shared with the user in step 538.

Figure 6:
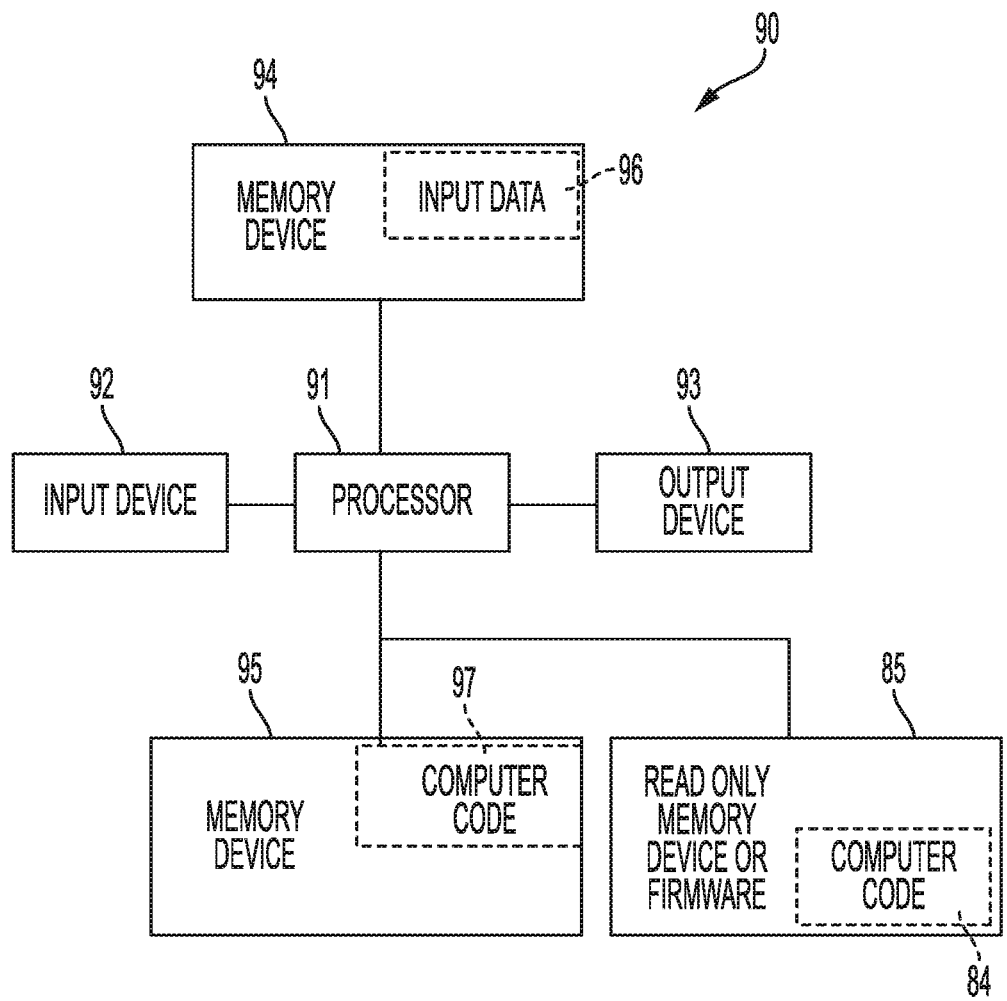
FIG. 6 illustrates a block diagram of a computer system used by the system of FIG. 1 for improving software and Internet technology associated with monitoring and analyzing Internet searches for detecting user attributes and determining a confidence level of the user attributes with respect to a level of an associated accuracy, in accordance with embodiments of the present invention.

FIG. 6 illustrates a block diagram of a computer system 90 (e.g., hardware device 138, location systems 139, video retrieval systems 122, and utility/construction/weather systems 121 of FIG. 1) used by or comprised by the system 100 of FIG. 1 for improving software and Internet technology associated with monitoring and analyzing Internet searches for detecting user attributes and determining a confidence level of the user attributes with respect to a level of an associated accuracy, in accordance with embodiments of the present invention.

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 6 includes a processor 91, an input device 92 coupled to the processor 91, an output device 93 coupled to the processor 91, a network device 72 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random-access memory (DRAM), a read-only memory (ROM), etc. The memory device 95 includes a computer code 97. The computer code 97 includes algorithms (e.g., the algorithm of FIG. 2) for improving software and Internet technology associated with monitoring and analyzing Internet searches for detecting user attributes and determining a confidence level of the user attributes with respect to a level of an associated accuracy. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices such as Read-Only Memory (ROM) device or firmware 85) may include algorithms (e.g., the algorithm of FIG. 2) and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

The networking device 72 is a device designed to communicate with other computer systems over networks commonly known as local area networks, wide area networks, campus area networks, and metropolitan area networks, using physical links such as, inter alia, wired, optical, or wireless, using data link protocols such as TCP/IP, UDP, ATM, Frame Relay, etc.

In some embodiments, rather than being stored and accessed from a hard drive, optical disc or other writeable, rewriteable, or removable hardware memory device 95, stored computer program code 84 (e.g., including algorithms) may be stored on a static, nonremovable, read-only storage medium such as ROM device or firmware 85, or may be accessed by processor 91 directly from such a static, nonremovable, read-only medium. Similarly, in some embodiments, stored computer program code 97 may be stored as ROM device or firmware 85, or may be accessed by processor 91 directly from such ROM device or firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to improve software and Internet technology associated with monitoring and analyzing Internet searches for detecting user attributes and determining a confidence level of the user attributes with respect to a level of an associated accuracy. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for improving software and Internet technology associated with monitoring and analyzing Internet searches for detecting user attributes and determining a confidence level of the user attributes with respect to a level of an associated accuracy. In another embodiment, the invention provides a business method that performs the process steps of the invention on a subscription, advertising, and/or fee basis. That is, a service supplier, such as a Solution Integrator, could offer to enable a process for improving software and Internet technology associated with monitoring and analyzing Internet searches for detecting user attributes and determining a confidence level of the user attributes with respect to a level of an associated accuracy. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 6 shows the computer system 90 as a configuration of hardware and software, any configuration of hardware and software, as would be known to a person of ordinary skill in the art, may be utilized for the purposes stated supra in conjunction with the computer system 90 of FIG. 6. For example, the memory devices 94 and 95 may be portions of a single memory device rather than separate memory devices.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
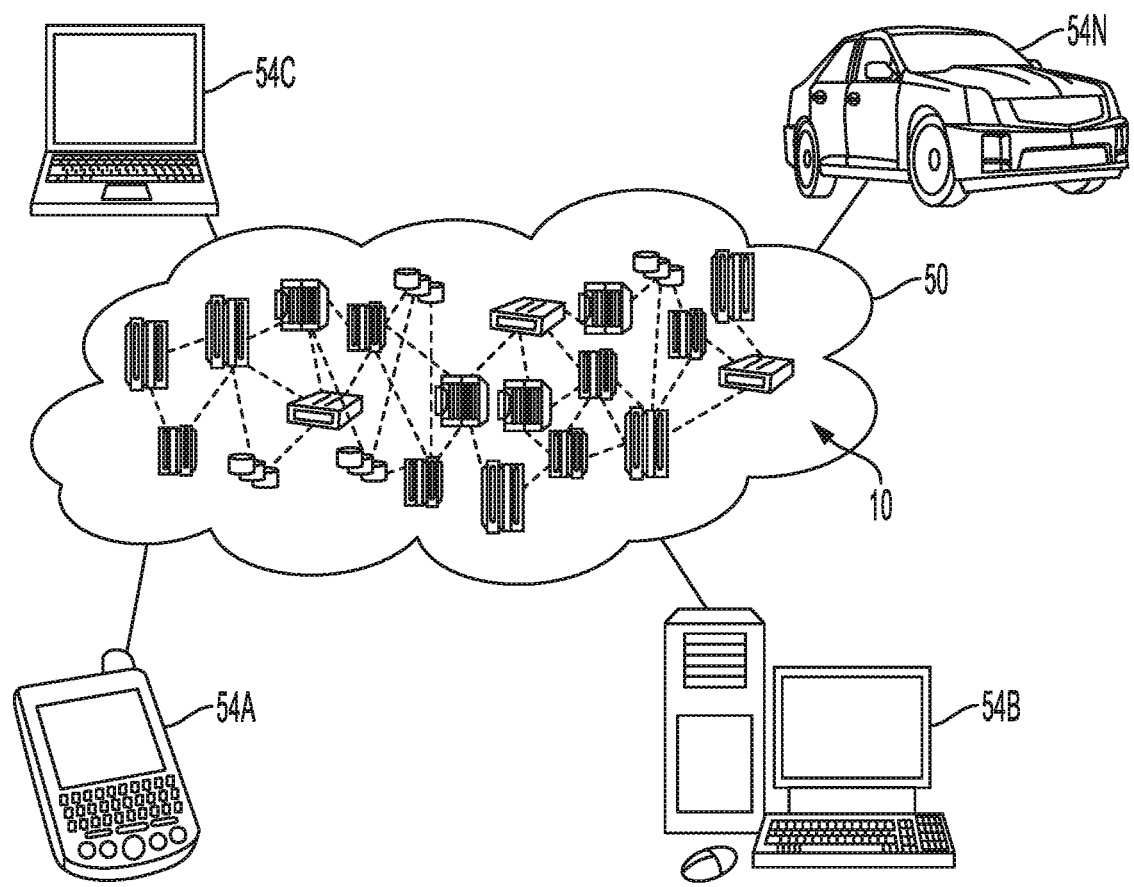
FIG. 7 illustrates a cloud computing environment, in accordance with embodiments of the present invention.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 7 are intended to be illustrative only and that computing nodes 10 and cloud computing environment 50 can communicate with any type of computerized device over any type of network and/or network addressable connection (e.g., using a web browser).

Figure 8:
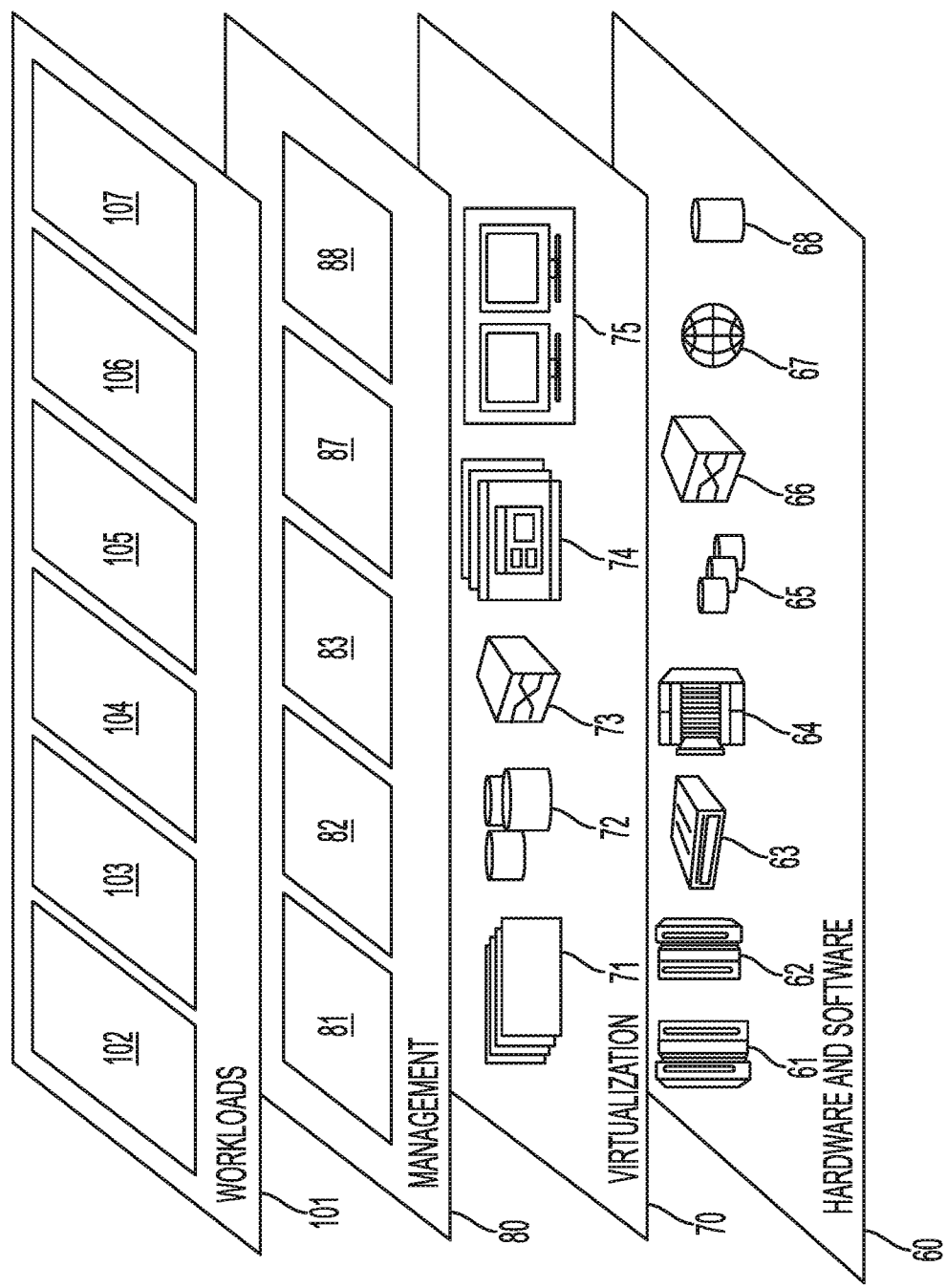
FIG. 8 illustrates a set of functional abstraction layers provided by cloud computing environment, in accordance with embodiments of the present invention.

Referring now to FIG. 8, a set of functional abstraction layers provided by cloud computing environment 50 (see FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 87 provides cloud computing resource allocation and management such that required service levels are met. Service Level Agreement (SLA) planning and fulfillment 88 provide pre-arrangement for, and procurement of, cloud computing resources for which a future requirement is anticipated in accordance with an SLA.

Workloads layer 101 provides examples of functionality for which the cloud computing environment may be utilized. Examples of workloads and functions which may be provided from this layer include: mapping and navigation 102; software development and lifecycle management 103; virtual classroom education delivery 133; data analytics processing 134; transaction processing 106; and improving software and Internet technology associated with monitoring and analyzing Internet searches for detecting user attributes and determining a confidence level of the user attributes with respect to a level of an associated accuracy 107.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. An automated feedback validation method comprising:
monitoring, by a processor of a hardware device, in response to receiving permission from a user, an Internet search associated with locating preferred user attributes associated with a specified geographical location;
analyzing, by said processor, results of said Internet search, wherein said analyzing comprises;
comparing images representing said specified geographical location, retrieved from presentations of said results of said Internet search, with actual retrieved current images of said specified geographical location, wherein said actual retrieved current images are retrieved from a video retrieval system located external to said specified geographical location, and wherein said comparing comprises: capturing geo-spatial data and timestamp data associated with said actual retrieved current images, retrieving global positioning satellite (GPS) data associated with said actual retrieved current images, and executing blockchain code for tracking image features of said actual retrieved current images with respect to time; and
determining based on results of said comparing, an accuracy of said actual retrieved current images with respect to current conditions at said specified geographical location;
verifying, by said processor, based on results of said analyzing, said preferred user attributes for accuracy;
determining, by said processor, based on results of said verifying, discrepancies between said preferred user attributes and attributes associated with said specified geographical location;
applying, by said processor, based on results of said determining, a confidence factor to said preferred user attributes with respect to a level of said accuracy; and
transmitting, by said processor, a notification indicating a confidence rating applied to said preferred user attributes with respect to said level of said accuracy.

2. The method of claim 1, wherein said preferred user attributes comprise attributes selected from the group consisting of requirements of specified geographical location features of said specified geographical location and selected options of said specified geographical location.

3. The method of claim 1, wherein said preferred user attributes are associated with a structure located at said specified geographical location.

4. The method of claim 1, wherein said verifying said preferred user attributes for accuracy comprises:
retrieving and analyzing feedback from an individual comprising an association with said specified geographical location.

5. The method of claim 4, wherein said feedback is retrieved from social media sources of said individual.

6. The method of claim 4, wherein said feedback comprises information selected from the group consisting of comments of said individual with respect to said geographical location and photographs associated with said geographical location.

7. The method of claim 1, wherein said verifying said preferred user attributes for accuracy comprises:
retrieving and analyzing feedback from a plurality of video retrieval devices located at said geographical location.

8. The method of claim 1, wherein said verifying said preferred user attributes for accuracy comprises:
retrieving and analyzing feedback from construction update sources associated with said geographical location.

9. The method of claim 1, wherein said results of said verifying indicate that all attributes of said preferred user attributes have not been located, wherein said method further comprises:
receiving, by said processor, from an agent associated with said specified geographical location, confirmation associated with an availability of all attributes of said preferred user attributes, wherein said a confidence factor is generated based on said confirmation.

10. The method of claim 1, further comprising:
scheduling, by said processor, based on said confidence factor, repairs associated with said specified geographical location, wherein said notification further indicates said repairs.

11. The method of claim 1, further comprising:
scheduling, by said processor, based on said confidence factor, maintenance associated with said specified geographical location, wherein said notification further indicates said maintenance.

12. The method of claim 1, further comprising:
providing at least one support service for at least one of creating, integrating, hosting, maintaining, and deploying computer-readable code in the control hardware, said code being executed by the computer processor to implement: said monitoring, said analyzing, said verifying, said determining, said applying, and said transmitting.

13. A computer program product comprising a computer readable hardware storage device storing a computer readable program code, said computer readable program code comprising an algorithm that when executed by a processor of a hardware device implements an automated feedback validation method, said method comprising:
monitoring, by said processor, in response to receiving permission from a user, an Internet search associated with locating preferred user attributes associated with a specified geographical location;
analyzing, by said processor, results of said Internet search, wherein said analyzing comprises;
comparing images representing said specified geographical location, retrieved from presentations of said results of said Internet search, with actual retrieved current images of said specified geographical location, wherein said actual retrieved current images are retrieved from a video retrieval system located external to said specified geographical location, and wherein said comparing comprises: capturing geo-spatial data and timestamp data associated with said actual retrieved current images, retrieving global positioning satellite (GPS) data associated with said actual retrieved current images, and executing blockchain code for tracking image features of said actual retrieved current images with respect to time; and
determining based on results of said comparing, an accuracy of said actual retrieved current images with respect to current conditions at said specified geographical location;
verifying, by said processor, based on results of said analyzing, said preferred user attributes for accuracy;
determining, by said processor, based on results of said verifying, discrepancies between said preferred user attributes and attributes associated with said specified geographical location;
applying, by said processor, based on results of said determining, a confidence factor to said preferred user attributes with respect to a level of said accuracy; and
transmitting, by said processor, a notification indicating a confidence rating applied to said preferred user attributes with respect to said level of said accuracy.

14. The computer program product of claim 13, wherein said preferred user attributes comprise attributes selected from the group consisting of requirements of specified geographical location features of said specified geographical location and selected options of said specified geographical location.

15. The computer program product of claim 13, wherein said preferred user attributes are associated with a structure located at said specified geographical location.

16. The computer program product of claim 13, wherein said verifying said preferred user attributes for accuracy comprises:
retrieving and analyzing feedback from an individual comprising an association with said specified geographical location.

17. The computer program product of claim 16, wherein said feedback is retrieved from social media sources of said individual.

18. The computer program product of claim 16, wherein said feedback comprises information selected from the group consisting of comments of said individual with respect to said geographical location and photographs associated with said geographical location.

19. The computer program product of claim 13, wherein said verifying said preferred user attributes for accuracy comprises:
retrieving and analyzing feedback from a plurality of video retrieval devices located at said geographical location.

20. A hardware device comprising a processor coupled to a computer-readable memory unit, said memory unit comprising instructions that when executed by the processor implements an automated feedback validation method comprising:
monitoring, by said processor, in response to receiving permission from a user, an Internet search associated with locating preferred user attributes associated with a specified geographical location;
analyzing, by said processor, results of said Internet search, wherein said analyzing comprises;
comparing images representing said specified geographical location, retrieved from presentations of said results of said Internet search, with actual retrieved current images of said specified geographical location, wherein said actual retrieved current images are retrieved from a video retrieval system located external to said specified geographical location, and wherein said comparing comprises: capturing geo-spatial data and timestamp data associated with said actual retrieved current images, retrieving global positioning satellite (GPS) data associated with said actual retrieved current images, and executing blockchain code for tracking image features of said actual retrieved current images with respect to time; and
determining based on results of said comparing, an accuracy of said actual retrieved current images with respect to current conditions at said specified geographical location;
verifying, by said processor, based on results of said analyzing, said preferred user attributes for accuracy;
determining, by said processor, based on results of said verifying, discrepancies between said preferred user attributes and attributes associated with said specified geographical location;
applying, by said processor, based on results of said determining, a confidence factor to said preferred user attributes with respect to a level of said accuracy; and
transmitting, by said processor, a notification indicating a confidence rating applied to said preferred user attributes with respect to said level of said accuracy.

* * * * *